April 18, 1944.  E. E. RUSSELL  2,346,874

FILM SPLICER

Filed Feb. 12, 1941  3 Sheets-Sheet 1

INVENTOR
Edward E. Russell
BY
Robt. L. Gunn
ATTORNEY

April 18, 1944.　　　E. E. RUSSELL　　　2,346,874
FILM SPLICER
Filed Feb. 12, 1941　　　3 Sheets-Sheet 2

INVENTOR
Edward E. Russell.

BY Robt. L. Gunn
ATTORNEY

April 18, 1944.　　　　E. E. RUSSELL　　　　2,346,874
FILM SPLICER
Filed Feb. 12, 1941　　　3 Sheets-Sheet 3

INVENTOR
Edward E Russell

BY Robt. L. Gunn
ATTORNEY

Patented Apr. 18, 1944

2,346,874

UNITED STATES PATENT OFFICE 2,346,874

FILM SPLICER

Edward Ernest Russell, Los Angeles, Calif., assignor to Twentieth Century-Fox Film Corporation, Los Angeles, Calif., a corporation of New York Application February 12, 1941, Serial No. 378,544

13 Claims. (Cl. 154—42)

This invention relates to the art of motion picture photography and deals with a splice particularly advantageous for use in processing motion picture film.

In processing motion picture film, it is customary to splice two or more strips of film to make a continuous strip that may be run through the conventional processing tanks. Since a splice of this nature must work in solution and over a great many rollers, and since a break in a run of film during the processing treatment not only causes considerable delay but a loss of film as well, it is imperative that any splice to be used in the tanks must first of all be dependable; that is, it must not let go under any conditions. Also, due to the use of an air blower for drying film, there must not be protuberances or metal clamps of any sort on the film that would damage the rubber rollers of the air drying apparatus. As an additional requirement, any splice to be used in processing film must be capable of repeated use without deterioration, which means that it must be flexible enough to pass around a great many rollers a great many times, and must likewise be capable of withstanding the chemical reaction of the processing fluids.

To meet these requirements, I recommend a splice formed of adhesive tape. A splice of this nature fulfills the requirements as to flexibility and solves the problem of metal protuberances. By using specially prepared tape immune to the chemical reactions of the processing solutions, the question of the deterioration or the life of the splice was solved. In addition to splicing the film with a piece of adhesive tape, I conceived of locking the tape to the film, or in effect meshing the tape to the film by pressing the adhesive side of the tape upon itself through the sprocket holes in the abutting film strips. This insured that the tape would not strip from the film and, due to the gripping action between the two adhesive sides of the tape, gave a binding effect upon the film which far exceeded any adhesive effect between the film and the tape alone.

In practice the film splice is formed by a mechanism which comprises means for properly trimming and holding in spaced relation two sections of film strips to form an abutting joint. Means are provided for cutting a proper length of tape, and the tape is then wrapped around the joint in such a manner as to overlap upon itself and cover one or more sprocket holes in the ends of the film strips on each side of the joint. As the pressure is applied ot the joint to insure a seal between the tape and the film strips, additional pressure is brought to bear over the sprocket holes in the film, which presses the tape through the sprocket holes until the two adhesive sides of the tape engage each other and form a plurality of seals through the sprocket holes. Once the tape is adhered to itself and the film, it is practically impossible to strip it from the film by tension upon the film alone. Splices formed in this manner have been used in actual operation over a period of time exceeding the life of a metal splice and have not shown appreciable deterioration. Accordingly, it becomes an object of this invention to provide a film splice wherein abutting ends of film strips are joined by overlapping tape and wherein the tape is adhered to itself through the sprocket holes in the abutting ends of the film strips. Another object is to provide a mechanism for producing film splices of the character described.

Other objects and advantages will become apparent as the description proceeds in conjunction with the drawings, in which.

Briefly stated, my invention includes a film splice wherein the abutting ends of the film strips are overlapped with adhesive tape, and the tape not only adheres to the film surface but is forced to adhere to itself through the sprocket holes or equivalent holes in the film, together with a machine for forming the same.

In its preferred form the machine comprises means for holding two strips of film so that they may be simultaneously trimmed and subsequently moved into abutting relation for splicing. In addition, the machine includes means for feeding the proper amount of tape to the splice and means for pressing the tape around the joint, together with means for pressing the tape over the sprocket holes in the film so that the tape will be forced to adhere to itself through the sprocket holes and produce a locking effect with the film.

Figure 1:
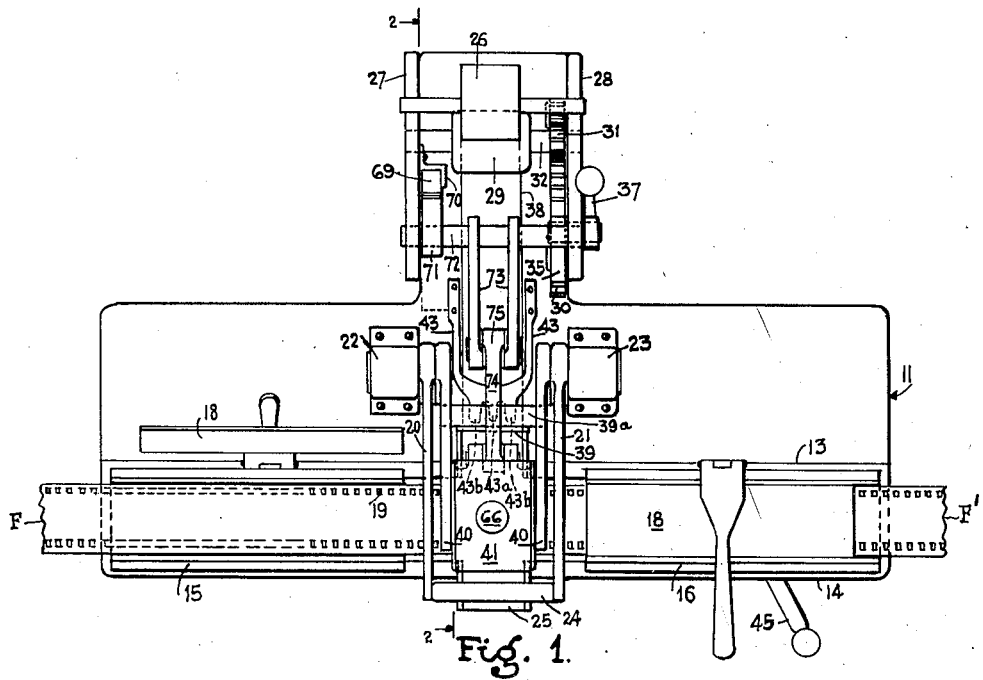
Figure 1 is a top plan view of the complete mechanism showing two film strips in the process of being spliced.
Figure 2:
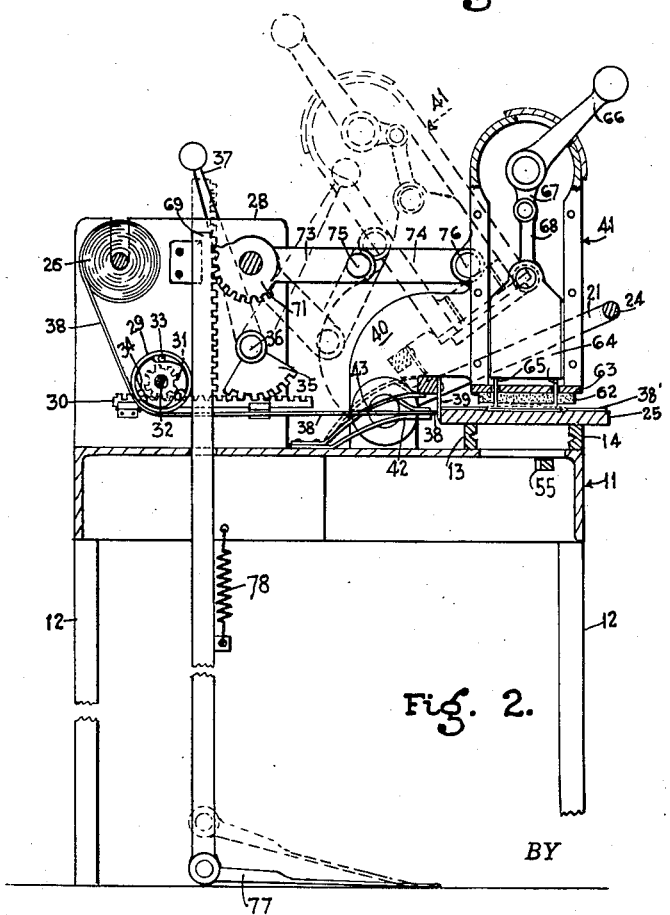
Figure 2 is a section on line 2—2 of Figure 1.
Figure 4:
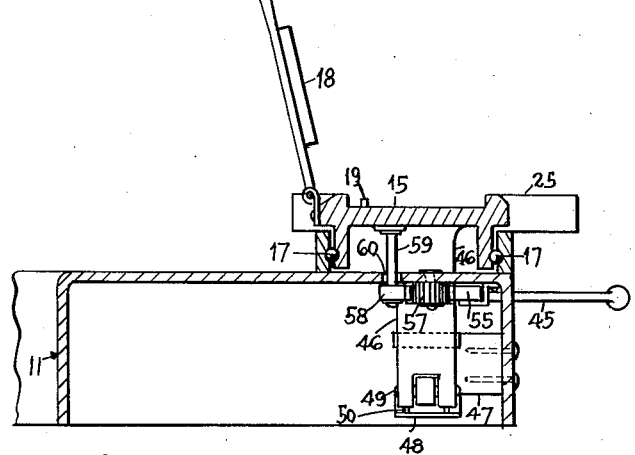
Figure 4 is a section on line 4—4 of Figure 3.
Figure 5:
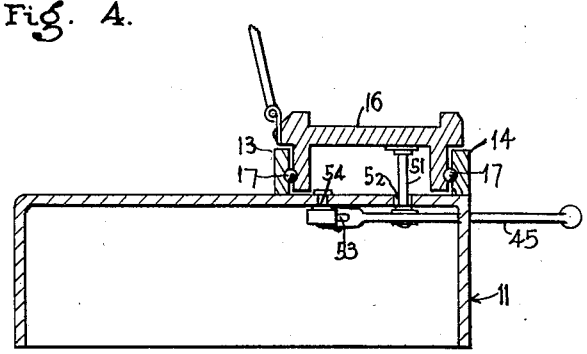
Figure 5 is a section on line 5—5 of Figure 3.

Referring to the drawings, for a more detailed description it will be observed in Figures 1 and 2 that my invention, broadly speaking, comprises a base generally designated 11, which may for convenience be mounted upon legs 12. The base in this instance is T-shaped to conform more conveniently to the requirements of the apparatus but does not necessarily have to be of this particular shape. Mounted upon the base in any suitable manner are two rails 13 and 14 and upon these rails I mount two carriages 15 and 16. The carriages are adapted to be moved longitudinally on the rails and for this purpose are mounted upon rollers 17 running between the rails and the carriages, as best shown in Figures 4 and 5. The carriages are each provided with a hinged cover plate 18 which may be lowered into place to hold the film strips F and F' in position. In addition, each of the carriages is provided with a pin 19, which is for the purpose of engaging a sprocket hole in each of the sections of the film to bring the sprocket holes in the film into proper relation for the punch pins, to be later described, when the films are moved into abutting relation to be spliced.

Means are provided for simultaneously trimming the strips of film F and F' and, as shown, comprises arms 20 and 21 pivotally mounted on bearings 22 and 23 respectively and connected at their outer ends by a cross member 24. These arms are adapted to be swung on their bearings and cut the two strips of film by a shearing action along both sides of a plate 25, which is mounted upon the rails 13 and 14 (see Figure 6). After the shearing operation the arms 20 and 21 are raised into an out-of-the-way position and a measured strip of tape is brought across the plate 25, whereupon the tape is cut and left in position. The means for supplying the measured tape comprises a roll of tape 26 suitably mounted between end plates 27 and 28, which in turn are carried on the base 11, together with means for measuring and cutting the tape. The means for measuring the tape from the roll 26 consists of a roller 29 having means for moving the roller a predetermined amount to strip off the proper length of tape from the roll 26. This mechanism is best shown in Figures 1 and 2 and comprises a rack 30 slidably mounted on the plate 28, said rack meshing with a pinion 31 which is fixed to a shaft 32 rotatably mounted in the end plates 27 and 28. The shaft 32 is coupled to the roller 29 by means of a uni-directional clutch arrangement consisting of conventional rollers 33 riding on inclined faces 34. This is the regulation uni-directional clutch and no further detail need be mentioned here. The means for moving the rack 30 consists of a segmental gear 35 mounted upon a shaft 36, which extends through the end plate 28 and is engaged by a handle 37 on the outside of the plate. By moving the handle to the position shown by solid lines in Figure 2, the roller 29 is made to revolve and pulls a measured strip of tape 38 from the roller 26 and makes it available for drawing across the plate 25 by the operator. As shown in Figure 2, the cutting operation has just taken place on the tape. Here it will be noted that a cutter 39, mounted on a cutter block 39a, has sheared the tape 38 along the inner edge of the plate 25, leaving a section 38' lying flat on the plate. The block 39a is mounted upon arms 40, which carry a head generally designated 41 to be later described. As a means of picking up and holding the cut end of the tape 38, so that it may be grasped by the fingers of the operator for the next splice, I provide a spring member 42 suitably mounted on the base 11 adapted to yieldingly engage the underside of the tape 38. A second spring member 43, also suitably mounted on the base 11, is provided and arranged to extend over the upper adhesive side of the tape 38. The free end of this member is formed into an upper finger 43a and two lower spaced fingers 43b. The upper finger 43a is adapted to be engaged by the cutter block 39a and depress the fingers 43b so that they will engage the adhesive side of the tape and will force the cut end of the tape downwardly against the under spring member 42 as the cutter 39 is depressed to cut the tape. As the cutter is released and is rotated back into its normal position, the spring member 43 being released will spring back into the dotted position shown and, since the tape is stuck to the fingers 43b, it will raise the tape enough so that it may be grasped between the tips of the fingers by the operator for the next operation. The tape section 38' is left lying flat in the channel 44 (see Figure 3) at this stage. After this the trimmed film strips F and F' are moved into abutting relation by means of a handle 45, which moves the two carriages 15 and 16 toward each other and brings the two ends of the film F and F' into properly spaced abutting relation.

Figure 3:
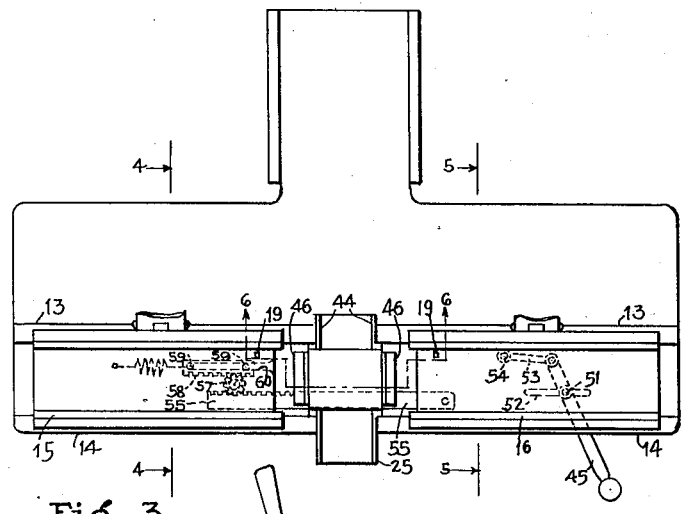
Figure 3 is a top plan view similar to Figure 1 with part of the mechanism removed to show the means for moving the film tables.
Figure 6:
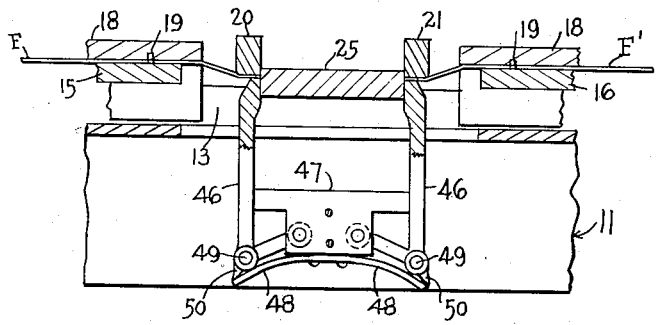
Figure 6 is a fragmentary section on line 6—6 of Figure 3 showing the step of trimming the films.
Figure 7:
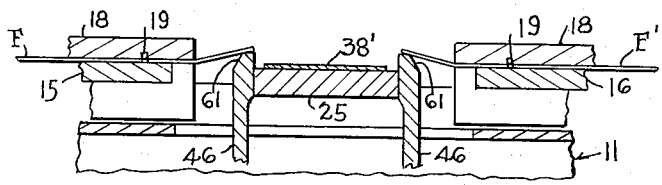
Figure 7 is a fragmentary view similar to Figure 6 showing the finished step of the trimming operation.
Figure 8:
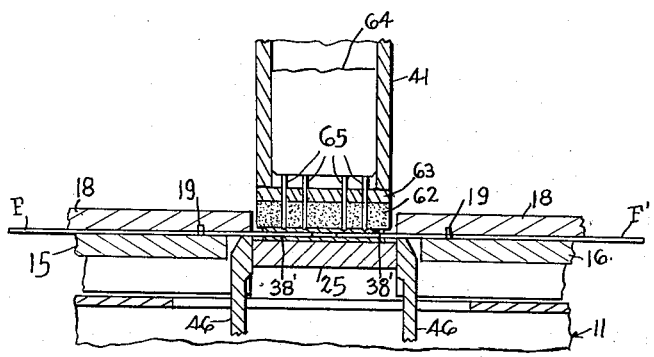
Figure 8 is a view similar to Figure 7 showing the completion of the formation of the splice by forcing the pins to bring pressure over the sprocket holes of the film.

In order to insure that the ends of the film strips will not engage the wet side of the tape before they are moved into proper relation, I provide means for yieldingly holding the ends of the film in an elevated position until they have arrived at the proper positions, whereupon the ends of the film are lowered on to the adhesive side of the tape. This means is best shown in Figures 6, 7, and 8. Here it will be observed that on opposite sides of the plate 25 I provide upstanding arms 46 which are depressibly and rotatably mounted upon a block 47 carried upon the base 11. As shown, these arms 46 may be yieldingly depressed, due to the fact that they are held in position by a spring 48, and may be rotated upon pivots 49, since they are held in an upright position on their pivots 49 by means of small tongues 50 engaging the spring 48. The two tables 15 and 16 are moved toward each other, as before stated, by means of the handle 45, which is pivotally attached to the table 16 by a pin 51 operating through a slot 52 in the base 11. The inner end of the lever 45 is pivotally connected to a link 53, which link in turn is pivotally connected to the base 11 by the pivot 54. The means for interconnecting the movement of the two tables is provided through a rack 55, which is connected to the table 16 but which is slidably mounted on the base 11 by a bracket 56 (see Figure 4). The rack in turn engages a pinion 57 which is rotatably mounted upon the base 11 and which also engages a second rack 58. The last mentioned rack is connected to the table 15 by means of pins 59 which work through a slot 60 in the base 11. It can be seen from the foregoing connection that, as the table 16 is moved inwardly by means of the handle 45, the table 15 will be moved inwardly an equal amount. It will be noted that at the inner ends of the tables the bed section, or that section of the table which corresponds to the film width, is shortened with respect to the sides of the table. This is best shown in Figure 3. In Figures 7 and 8 the purpose of this becomes apparent. Here it will be observed that the cover plate 18 on each table extends beyond the bed section of the table and that the arms 46 force the films F and F' to ride upwardly as the tables 15 and 16 are moved inwardly, thus avoiding contact with the tape strip 38'. However, as the ends of the covers 18 engage the sloping faces 61 on the arms 46, the arms are depressed and, as the covers ride over the tops of the arms, the ends of the film are snapped down on to the adhesive surface of the tape as shown in Figure 8.

Figure 9:
Figure 9 is an enlarged sectional view of the splice itself taken on line 9—9 of Figure 10.
Figure 10:
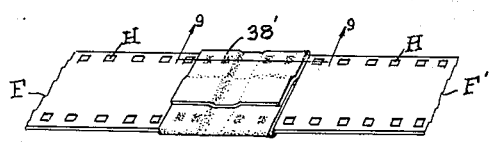
Figure 10 is a perspective view of the splice as it would appear on the film.

After the two film sections have been moved into the above relation, the free ends of the tape are then wrapped over the top surface of the film and overlapped upon themselves (see Figures 2 and 10). It remains to press the tape against the film to form a good bond between the film and the tape and also to push the tape through the sprocket holes of the film to form a bond between the adhesive sides of the tape itself, as best shown in Figure 9. This view is an enlarged section of the splice along the sprocket holes of the film. Here, it can be seen how the tape 38' may be contacted upon itself through the sprocket holes H to form a locking effect between the tape and the film strips F and F'. This pressing and pushing action is done by means of the head 41, previously mentioned, as being mounted upon the arms 40, which in turn are pivotally mounted in the bearings 22 and 23. The head 41 carries on its lower end a cushion 62 of suitable material, preferably rubber, mounted upon a plate 63. Inside the head I provide a reciprocable member 64, which carries a plurality of pins 65 arranged to register with the sprocket holes in the two film sections. The member 64 is reciprocated by means of a lever 66, suitably mounted in the upper end of the head 41 and connected to the member 64 through links 67 and 68. The means for swinging the head into the full line position, shown in Figure 2, from the dotted position shown in the same figure, comprises a rack 69 slidably mounted in the base 11 and on the plate 27 by means of a bracket 70. The rack in turn engages a pinion 71 which is fixed to a shaft 72 rotatably mounted in the end plates 27 and 28. Upon the shaft 72 I fixedly mount cranks 73 which pivotally engage a second crank 74 as shown at 75. The crank 75 is in turn pivotally connected to the head 41, as indicated at 76. It can be seen from the mechanism just described that, as the rack 69 is pulled down by any suitable means such as a foot treadle 77, the head 41 will be swung from the dotted position shown to the full line position.

To form a splice, the strips of film F and F' are first mounted upon the tables 15 and 16 with the pins 19 passing through a sprocket hole. The covers 18 are then brought down into position and, with the lever 45 set in position shown in Figure 3, the cutter, comprising arms 20 and 21, is brought down, thus simultaneously trimming both sections of the film. The cutter is then raised and left in an out-of-the-way position. It is to be understood that all during these operations the presser head 41 is in the normal raised position shown in dotted lines in Figure 2, due to the action of the spring 78. After the trimming operation, the tape is drawn out into the position previously mentioned and is cut with the means described hereinbefore, forming the section 38'. The film sections are then moved into abutting relation by swinging the lever 45 and, after the tape is wrapped around the joint, the head is brought down on to the joint by means of the treadle 77, and while the head is held against the joint the handle 66 is operated to force the pins 65 downwardly so that pressure would be brought to bear against the tape over the sprocket holes in the film. The result is that the tape is pressed into a good binding relation over the surface of the film and the tape itself is pressed through the sprocket holes in the film until the adhesive sides contact each other and form a seal. The joint thus formed consists of a binding effect between the tape and the film, and a further and more binding effect caused by the tape adhering to itself through the sprocket holes in the film. The finished splice is shown in Figure 10. Splices of this nature have been used consistently and successfully in film processing laboratories over a considerable time and have shown but little depreciation. A splice of the foregoing nature will not only fulfill the requirements as to endurance and durability but will also provide a smooth, nonprotruding fabric splice having no metal parts whatsoever.

I claim:

1. An apparatus for splicing motion picture film with adhesive tape comprising means for holding two strips of film in spaced end relation, and spaced pins for pressing the tape together through sprocket holes in the film.

2. An apparatus for splicing motion picture film with adhesive tape comprising means for holding two strips of film in spaced end relation, and reciprocable pins adapted to register with sprocket holes in the film for forcing the tape to contact upon itself through said sprocket holes.

3. An apparatus for splicing motion picture film with adhesive tape comprising means for holding two strips of film in predetermined positions, means for trimming the ends of said film strips in said positions, means for moving said trimmed strips into fixed abutting end relation so that a piece of adhesive tape may be wrapped around the ends of both strips to form a splice therebetween, and means for contacting the adhesive side of said tape upon itself through sprocket holes in the film.

4. An apparatus for splicing motion picture film with adhesive tape comprising means for holding two strips of film in predetermined positions, means for trimming the ends of said film strips in said positions, means for moving said trimmed strips into fixed abutting end relation so that a piece of adhesive tape may be wrapped around the ends of both strips to form a splice therebetween, means for pressing the tape around said splice to form a bond between the film and the tape, and means for applying additional pressure on said tape over sprocket holes in the film to force the tape to contact itself through said sprocket holes.

5. An apparatus for splicing motion picture film with adhesive tape comprising means for holding two strips of film in predetermined position, means for trimming the ends of said film strips in said position, means for supporting a predetermined length of tape between the ends of said film strips, means for moving said strips into predetermined abutting end relation over said tape so that the same may be wrapped around an end of each of said strips to form a splice therebetween, and means for forcing the tape through sprocket holes in the film strips to contact upon itself and form an increased bonding effect with the film in addition to the normal bonding effect between the tape and the film.

6. An apparatus for splicing motion picture film with adhesive tape comprising means for holding two strips of film in spaced end relation, means for trimming the ends of said film strips in said relation, means for supplying a predetermined length of adhesive tape, means for supporting said tape between the ends of said film strips, means for moving said film strips into abutting end relation so that said tape may be wrapped around the ends of said strips to form a splice therebetween, and means for forcing the tape to contact upon itself through sprocket holes in the film strips.

7. An apparatus for splicing motion picture film with adhesive tape comprising means for holding and trimming two film strips in spaced end relation, a roll of adhesive tape supported upon said apparatus, a feed roller for stripping a predetermined length of tape from said roller, means for operating said feed roller, means for cutting said length of tape, means for supporting said predetermined length of tape between the ends of said film strips, means for moving said film strips to predetermined positions over said length of tape so that the same may be wrapped around the ends of said strips to form a splice therebetween, and pin means adapted to register with sprocket holes in the film arranged to engage the tape and force the same to contact upon itself through said sprocket holes.

8. An apparatus for splicing motion picture film with adhesive tape comprising means for holding two strips of film in predetermined end relation, means for trimming the ends of said film strips in said relation, means for supporting a predetermined length of tape between the ends of said film strips, means for moving said strips into predetermined abutting end relation over said tape, side plates on said tape supporting means adapted to yieldingly hold the ends of said film strips above said tape as they are moved into abutting relation, means for depressing said side plates to lower said film strips on to said tape when they are moved into predetermined abutting end relation so that said tape may be wrapped around the ends of said strips to form a splice therebetween, and means for pressing the tape around said splice to form a bond between the film and the tape.

9. An apparatus for splicing motion picture film with adhesive tape comprising means for holding two strips of film in predetermined end relation, means for trimming the ends of said film strips in said relation, means for supporting a predetermined length of tape between the ends of said film strips, means for moving said strips into predetermined abutting end relation over said tape, side plates on said tape supporting means adapted to yieldingly hold the ends of said film strips above said tape as they are moved into abutting relation, means for depressing said side plates to lower said film strips on to said tape when they are moved into predetermined abutting end relation so that said tape may be wrapped around the ends of said strips to form a splice therebetween, means for pressing the tape around said splice to form a bond between the film and the tape, and means for contacting the adhesive side of said tape upon itself through sprocket holes in the film.

10. An apparatus for splicing motion picture film with adhesive tape comprising means for holding two strips of film in predetermined positions, means for trimming the ends of said film strips in said positions, means for moving said trimmed strips into fixed abutting end relation so that a piece of adhesive tape may be wrapped around the ends of both strips to form a splice therebetween, and means for pressing the tape around said splice to form a bond between the tape and the films said last mentioned means including a movable head having an elastic pad thereon adapted to engage said tape when said head is moved into a splice engaging position.

11. An apparatus for splicing motion picture film with adhesive tape comprising means for holding two strips of film in end relation so that a piece of adhesive tape may be wrapped around the ends of both films and extend over at least a sprocket hole in each film, a head adapted to be moved into pressing engagement with said tape, and pins in said head arranged to be moved outwardly therefrom to force said tape to adhere to itself through said sprocket holes in said film.

12. An apparatus for splicing motion picture film with adhesive tape comprising a frame, a pair of plates on said frame for holding two strips of film in predetermined positions, a cutter swingably mounted on said frame for trimming the ends of said film strips, means for moving said plates to bring the ends of said film strips into adjacent abutting relation so that a piece of adhesive tape may be wrapped around the ends of both film strips to form a splice extending over at least one sprocket hole in each of said films, a head swingably mounted on said frame, means for swinging said head to engage and press said tape about said splice, and pins in said head arranged to engage the tape and force the same into engagement with itself through said sprocket holes.

13. An apparatus for splicing motion picture film with adhesive tape comprising a frame, a pair of plates on said frame for holding two strips of film in predetermined positions, a cutter swingably mounted on said frame for trimming the ends of said film strips, means for moving said plates to bring the ends of said film strips into adjacent abutting relation so that a piece of adhesive tape may be wrapped around the ends of both film strips to form a splice extending over at least one sprocket hole in each of said films, a head swingably mounted on said frame, means for swinging said head to engage and press said tape about said splice, an elastic pad on said head arranged to come between said head and said tape to form a compressive engagement over said splice, movable pins in said head, and means for causing said pins to extend through said elastic pad and engage said tape over sprocket holes in said film strip and force said tape to adhere to itself through said holes.

EDWARD ERNEST RUSSELL.